United States Patent [19]

Satoh et al.

[11] 4,343,077

[45] Aug. 10, 1982

[54] AUTOMATIC TOOL EXCHANGING APPARATUS OF MACHINE TOOL

[75] Inventors: Mitsuharu Satoh; Katsuyoshi Aiso, both of Numazu, Japan

[73] Assignee: Toshiba Kikai Kabushiki Kaisha, Tokyo, Japan

[21] Appl. No.: 142,756

[22] Filed: Apr. 22, 1980

[30] Foreign Application Priority Data

Apr. 29, 1979 [JP] Japan .................................. 54-52734

[51] Int. Cl.³ .......................... B23Q 3/157; B66C 1/42
[52] U.S. Cl. .................................... 29/568; 294/116; 414/744 A; 414/753
[58] Field of Search ............... 29/568, 26 A; 414/729, 414/744 A, 753; 294/87.24, 116

[56] References Cited

U.S. PATENT DOCUMENTS

| | | | |
|---|---|---|---|
| 3,286,344 | 11/1966 | Brainard et al. | 29/568 |
| 3,412,459 | 11/1968 | Hollis | 29/568 |
| 3,811,179 | 5/1974 | Anderson | 29/568 |
| 3,818,580 | 6/1974 | Pagella et al. | 29/568 |
| 3,845,546 | 11/1974 | Rutschke | 294/116 X |
| 3,990,140 | 11/1976 | Polacek et al. | 29/568 |
| 4,119,213 | 10/1978 | Sato et al. | 29/568 X |

FOREIGN PATENT DOCUMENTS

2211123 10/1972 Fed. Rep. of Germany ........ 29/568

*Primary Examiner*—Z. R. Bilinsky
*Attorney, Agent, or Firm*—Koda and Androlia

[57] ABSTRACT

An automatic tool exchanging apparatus of a machine tool comprises a machine body, a tool storage magazine, a spindle attached to the machine body, a tool conveying mechanism and a tool exchanging mechanism which are located between the tool storage magazine and the spindle for exchanging a tool in the magazine with a tool in the spindle, and a drive unit for driving the tool exchanging and tool conveying mechanisms. The tool conveying mechanism comprises a guide bar horizontally arranged between a predetermined position of the tool storage magazine and an intermediate tool pot of the tool exchanging mechanism, a tool carriage movably supported by the guide bar, a tool carriage reciprocating mechanism, a tool conveying arm member rotatably supported by the tool carriage and provided with clamp arms to clamp a tool, a tool conveying arm member rotating mechanism, and a tool conveying arm member reciprocating mechanism.

6 Claims, 12 Drawing Figures

AUTOMATIC TOOL EXCHANGING APPARATUS OF MACHINE TOOL

BACKGROUND OF THE INVENTION

This invention relates to an improvement of an automatic tool exchanging apparatus of a machine tool and, more particularly, to a tool conveying mechanism incorporated in the tool exchanging apparatus.

In a known automatic tool exchanging apparatus of a machine tool, predetermined one of a number of tools stored in a tool storage magazine located on the side of the machine tool body is exchanged with a tool fitted in a spindle of the machine tool. For example, as disclosed in U.S. Pat. No. 4,119,213 which relates to a tool storage magazine device in the form of a pair of concentric inner and outer annular magazines of a machine tool, a desired tool in the magazine is transferred into a tool pot of a tool exchanging mechanism by a tool conveying arm located within the tool storage magazine, and the tool conveying arm is then swung in a horizontal plain to exchange the tool with a tool fitted in a spindle of a machine tool.

However, in a case where the tool storage magazine device discussed above is used, the tool exchanging arm has to be swung or moved every time when a used tool is returned from the spindle to a tool pot of the magazine and a desired new tool in the magazine is transferred to the spindle, and, at this time, the tool storage magazine has to be rotated to receive the used tool in an empty tool pot and to carry a desired new tool to a predetermined tool exchanging position.

Such operation makes complicate the structure and operation of the tool exchanging arm and precise control of the rotation of the tool storage magazine is also complicated.

SUMMARY OF THE INVENTION

Accordingly, an object of this invention is to provide an automatic tool exchanging apparatus of a machine tool capable of easily and precisely performing tool conveying and exchanging operation.

Another object of this invention is to provide a tool conveying mechanism incorporated with the tool exchanging apparatus capable of precisely exchanging a tool in a tool storage magazine with a tool fitted in a spindle of a machine tool.

Still another object of this invention is to provide a tool conveying mechanism which comprises two clamp arms provided with a member for precisely rotating the clamp arms in opposing directions and a member for firmly clamping a tool between the arms.

According to this invention, there is provided an automatic tool exchanging apparatus of a machine tool of the type comprising a machine body, a magazine for storing a number of tools located on the side of the machine body, a spindle of the machine tool, a tool exchanging mechanism and tool conveying mechanism which are located between the spindle and the tool storage magazine, and a drive unit for driving the tool exchanging and conveying mechanisms, the tool exchanging mechanism being provided with an intermediate tool pot and constructed to be swingable for exchanging a tool fitted in the spindle with a tool received in the intermediate tool pot, the tool conveying mechanism being adapted to transfer a tool between a predetermined tool pot of the tool storage magazine and the intermediate tool pot, and the tool exchanging apparatus is characterized in that the tool conveying mechanism comprises a guide bar horizontally arranged between a position at which the predetermined tool pot of the tool storage magazine is indexed and the intermediate tool pot, a tool carriage supported movably by the guide bar, a mechanism for reciprocating the tool carriage, a tool conveying arm member supported rotatably by the tool carriage and adapted to clamp a tool, a mechanism for rotating the tool conveying arm member mounted to the tool carriage, and a mechanism for reciprocating the tool conveying arm member.

In addition, according to this invention, there is provided an improved tool conveying arm member which is operatively connected to the rotation shaft and comprises a pair of clamp arms having arcuate portions and being rotatable in opposite direction about a common axis, a mechanism for rotating the clamp arms, and a mechanism for imparting tool clamp force to a tool held between the arcuate portions.

DESCRIPTION OF THE PREFERRED EMBODIMENT

Figure 1:
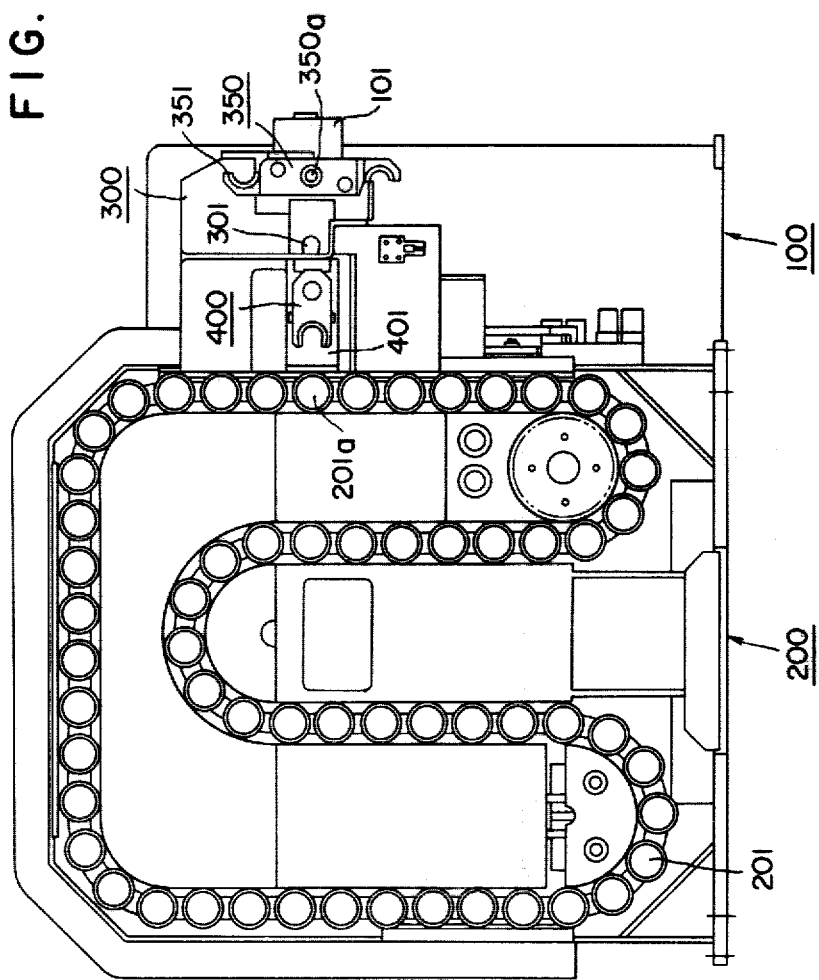
FIG. 1 shows a side view of a tool storage magazine associated with a tool exchanging apparatus of a machine tool according to this invention.
Figure 2:
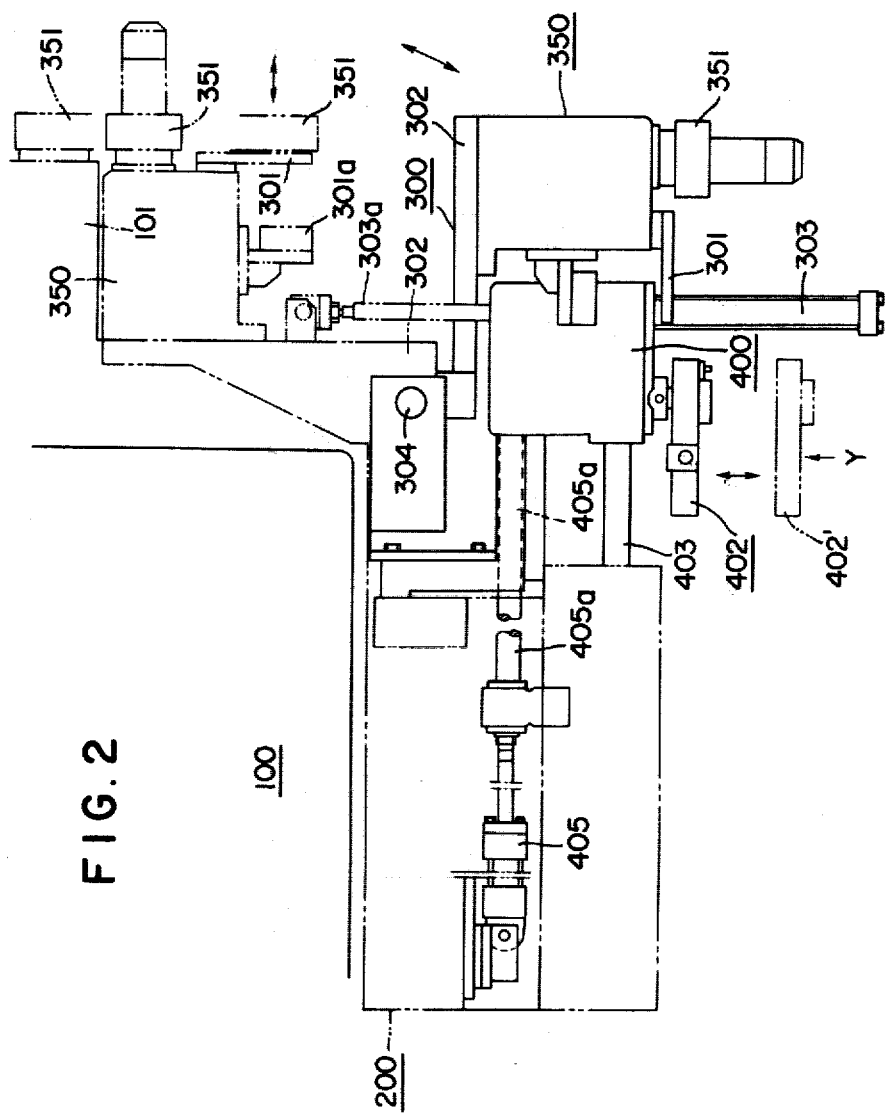
FIG. 2 is an enlarged schematic view showing a tool conveying mechanism of the tool exchanging apparatus shown in FIG. 1.
Figure 3:
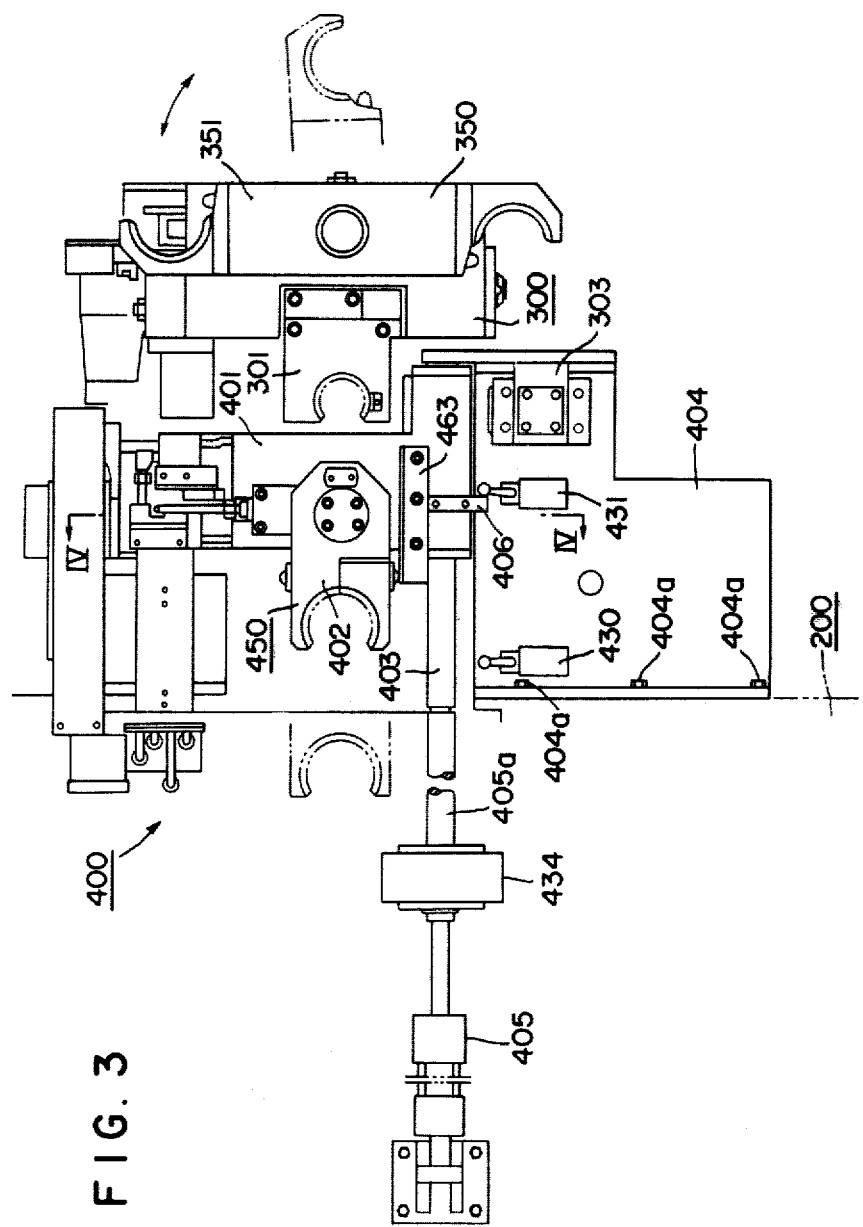
FIG. 3 shows the tool conveying mechanism shown in FIG. 2 as viewed in a direction of Y.

Referring to FIGS. 1 and 2, a spindle 101 of a machine tool is rotatably mounted to a machine tool body 100 on the righthand side as viewed in FIG. 1 and a tool storage magazine 200 containing a number of tool pots is arranged to be movable in the form of a chain. A tool conveying mechanism 400 and an automatic tool exchanging mechanism 350 fixed to a swingable arm mechanism 300 are located between the spindle 101 and the tool storage magazine 200. The tool storage magazine 200 is controlled so that a desired tool will be indexed at a position shown by a tool pot 201a. The tool conveying mechanism 400 operates so as to transfer a tool received in the tool pot 201a to an intermediate tool pot 301 located in the tool exchanging mechanism 350. The axis of the intermediate tool pot 301, the axis about which a tool exchanging arm 351 is rotated and the axis of the spindle 101 are positioned in the same horizontal plane.

The swingable arm mechanism 300 comprises a swingable arm 302, the tool exchanging mechanism 350 attached to the swingable arm 302, the tool exchanging arm 351 which is rotatable about the center 350a of the tool exchanging mechanism 350, the intermediate tool pot 301, and a device for driving the swingable arm mechanism. The swingable arm mechanism 300 is attached to a frame 404 of the tool conveying mechanism 400 through a pin 304 to be rotatable thereabout by 90°. In FIG. 2, when the swingable arm 302 is rotated about the pin 304, the intermediate tool pot 301 is displaced to a position where the axis of the tool pot 301 is parallel with the axes of the tool pot 201a and the spindle 101.

A tool received in the intermediate tool pot 301 is exchanged with a used tool fitted to the spindle 101 by the operation of the tool exchanging arm 351 when the intermediate tool pot 301 is rotated to the position where the axis thereof is parallel with the axis of the spindle 101. A tool transferred from the spindle to the intermediate tool pot 301 is returned to an empty tool pot of the tool storage magazine 200 in the manner reverse to that described above.

The tool conveying mechanism 400 is operated in a tool exchanging cycle in accordance with a manner described hereunder in conjunction with FIGS. 3 through 11.

Figure 5:
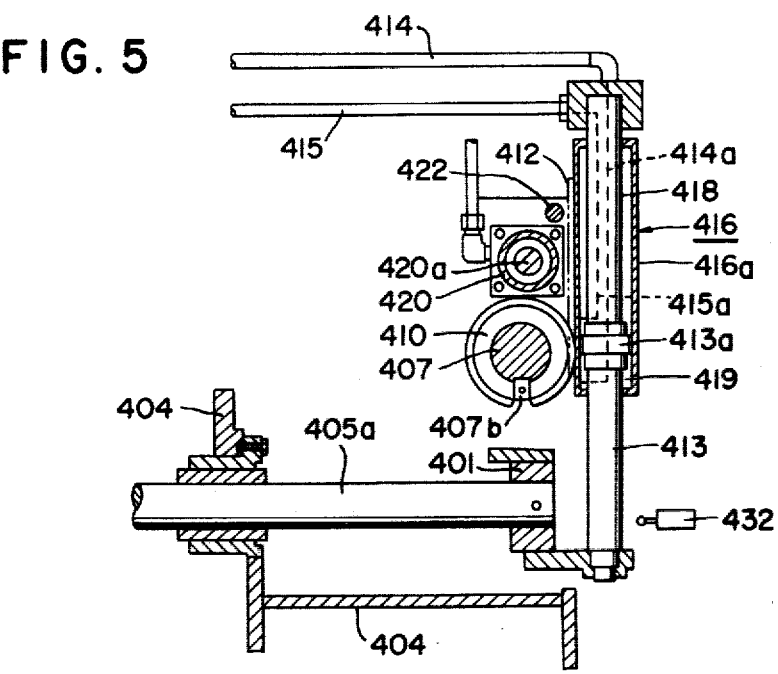
FIG. 5 shows a cross sectional view taken along the line V—V shown in FIG. 4.
Figure 6:
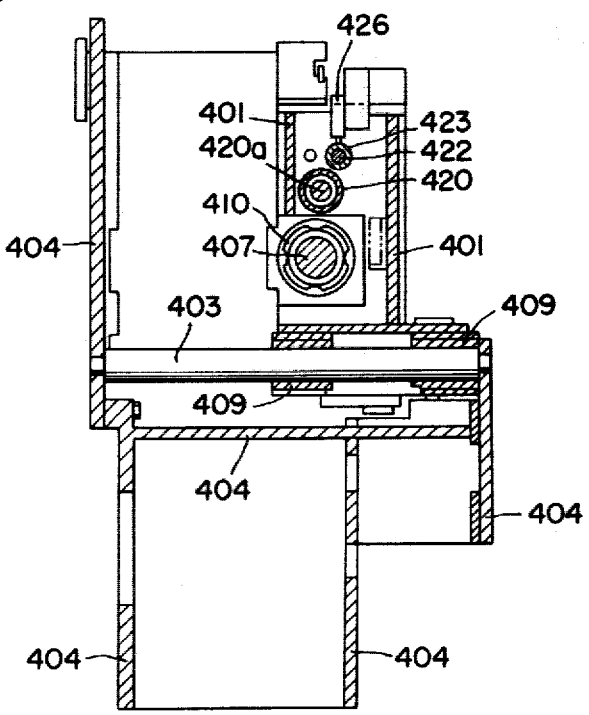
FIG. 6 shows a cross sectional view taken along the line VI—VI shown in FIG. 4.

The frame 404 of the tool conveying mechanism 400 formed by a sheet metal is secured to the side of the tool storage magazine 200 by bolts 404a. The frame 404 supports both ends of a guide bar 403 so as to be horizontally positioned as shown in FIG. 6 and a guide 409 is idly muonted on the guide bar 403 to operate as a guide member for a tool carriage 401. A hydraulic cylinder-piston assembly 405 is secured to the tool storage magazine 200 in parallel with the guide bar 403 and operates to reciprocate the tool carriage 401. A piston rod 405a of the hydraulic assembly 405 is supported by bearing means 434 secured to the frame 404, and as shown in FIG. 5, the tool carriage 401 is mounted to one end of the piston rod 405a.

Figure 4:
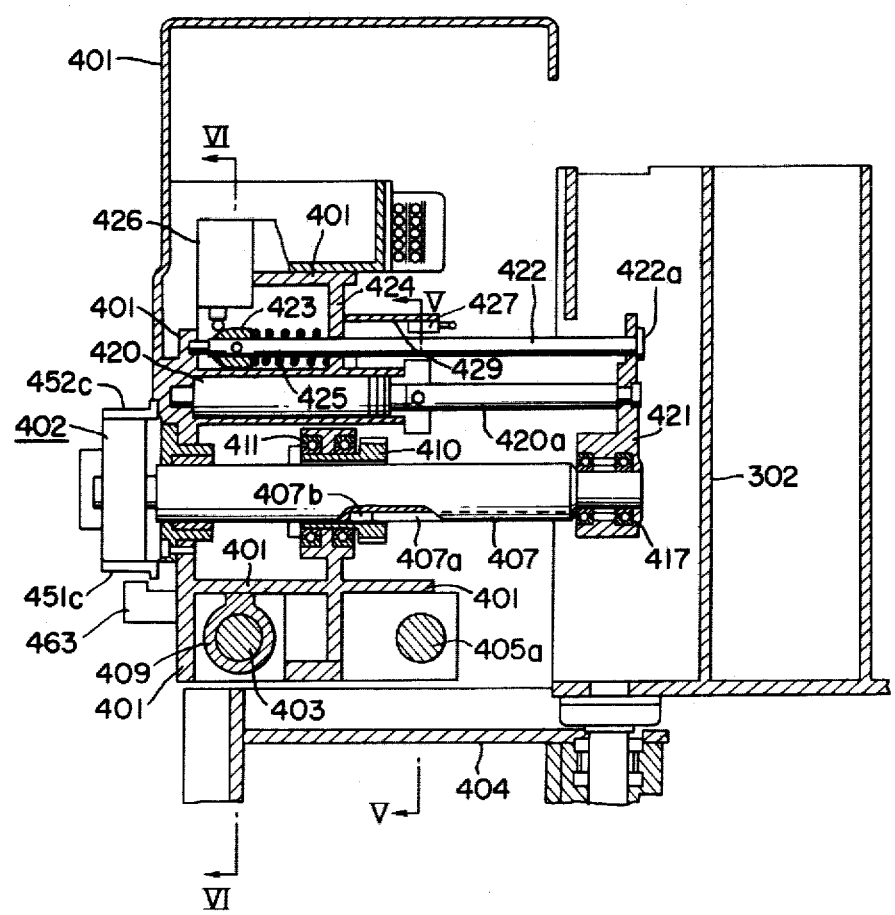
FIG. 4 shows a cross sectional view taken along the line IV—IV shown in FIG. 3.

Limit switches 403 and 431 are attached to the frame 404 so that they detect the fact that the tool carriage 401 is moved to its leftward and rightward limit positions (as viewed in FIG. 3) when a dog 406 mounted to the tool carriage contacts with the switches 403 and 431, respectively. A rotation shaft 407 is supported in a direction normal to the axis of the guide bar 403 by the tool carriage 401 through bearings 411 and 417, and a tool conveying arm member 402 comprising two clamps arms 451 and 452 is mounted to one end of the rotation shaft 407 as shown in FIG. 4. The rotation shaft 407 is provided on its peripheral surface with a groove 407a with which a key 407b can be engaged to prevent the independent rotation of a tool exchanging arm rotation mechanism which comprises the rotation shaft 407, the bearing 417 and members associated therewith for rotating the shaft 407. A pinion 410 is meshed with the shaft 407 for rotating the same and the pinion 410 is driven in engagement with a rack member 412 formed on the outer surface of a cylinder 416a of a hydraulic cylinder-piston assembly 416. As shown in FIG. 6, the piston rod 413 of the assembly 416 is supported at its both ends by the tool carriage 401, and the inner surface of the cylinder 416 contacts with a piston 413a which is positioned at a central portion of the piston rod 413.

The both ends of the cylinder 416a are bent so that the bent ends contact with the piston rod 413 thereby to define closed chambers 418 and 419. Oil passages 414a and 415a are formed within the piston rod 413 and oil supply pipes 414 and 415 are communicated with oil chambers 419 and 418 through the oil passages 414a and 415a, respectively, to constitute a hydraulic circuit, which will be described in detail hereinafter in conjunction with FIG. 12.

The reciprocation of the tool conveying arm member 402 is perfomred by a hydraulic cylinder-piston assembly 420 which is arranged in parallel with the axis of the rotation shaft 407 (FIG. 4). One end of the cylinder member of the hydraulic assembly 420 is secured to the tool carriage 401 and the free end of a piston rod 420a of the assembly 420 is supported by a supporting plate 421 which is integrally formed with the bearing 417. Thus, the rotation shaft 407 can be reciprocated in response to the movement of the piston rod 420a of the hydraulic assembly 420, thereby to reciprocate the tool conveying arm member 402.

A bar 422 detecting the limits of the forward and backward movements of the rotation shaft 407 is disposed in parallel with the axis of the shaft 407 as shown in FIG. 4. The lefthand end of the bar 422 is movably supported by the tool carriage 401 and a rib plate 424 and the righthand end thereof penetrates through the supporting plate 421 and is idly supported thereby. A member 422a having a diameter larger than that of the bar 422 is secured to the extreme righthand end of the bar 422 and the member 422a engages the supporting plate 421 only when the bar 422 moves leftwardly as viewed in FIG. 4. A dog 423 is mounted on the lefthand side of the bar 422 and a coil spring 425 is interposed between the dog 423 and the rib plate 424 to always urge the bar 422 leftwardly. A limit switch 426 having a normally closed contact is secured to the tool carriage 401 for detecting the fact that the tool conveying arm member 402 has reached its backward limit when the dog 423 contacts with the limit switch 426. Another limit switch 427 secured to the rib plate 424 detects the fact that the arm member 402 has reached its forward limit at the time when the supporting plate 421 abuts against the limit switch 427.

The detail structure of the tool conveying arm member 402 is described hereunder with reference to FIGS. 7 through 11.

Figure 7:
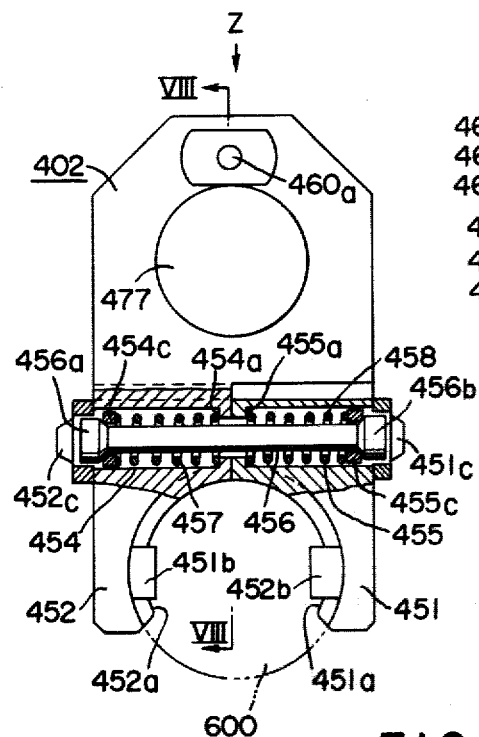
FIG. 7 shows a plan view, partially in section, of a tool conveying arm member.
Figure 9:
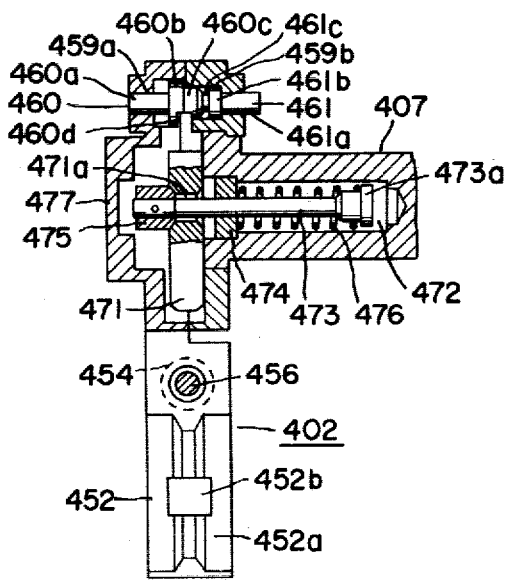
Figure 10:
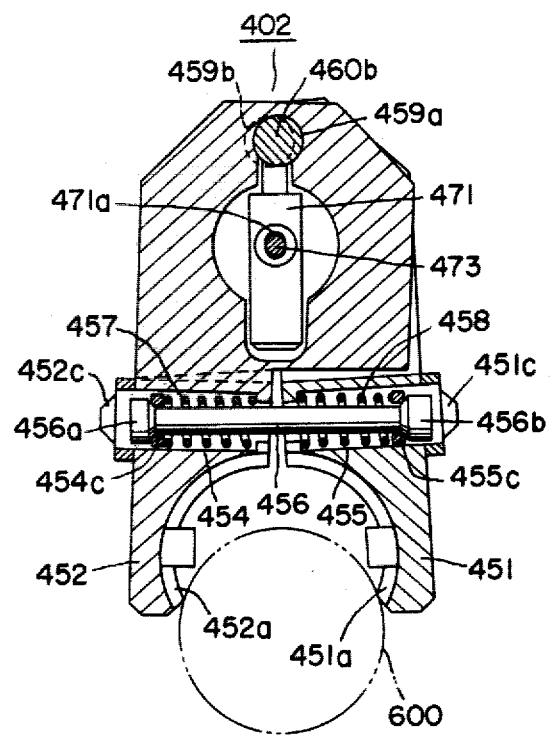
FIG. 10 shows a cross sectional view taken along the line X—X shown in FIG. 8.
Figure 11:
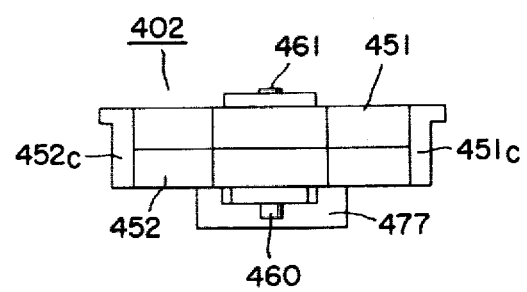
FIG. 11 shows a schematic view of the tool converying arm member as viewed in a direction of Z shown in FIG. 7.

As briefly shown in FIG. 11, the tool conveying arm member 402 comprises two clamp arms 451 and 452 superposed with each other and these arms are pivoted to be opened in opposite directions about the extended axis of a shaft 473 described hereinafter as shown in FIG. 10. The arms 451 and 452 have arcuate portions 451a and 452a which are provided with a V-shaped groove shown in FIG. 8 or 9, and key members 451b and 452b are fitted into the respective arcuate portions 451a and 452a. Through holes 454 and 455 are formed to the clamp arms 452 and 451 from the sides thereof and inside end openings of both holes are aligned with each other when the clamp arms 452 and 451 are closed, but both the outside end openings are closed by members 452c and 451c, respectively as shown in FIG. 7. The through holes are provided with stepped walls 454a and 455a and a shaft 456 is idly disposed within and through the holes. The shaft 456 is provided at its both ends with members 456a and 456b having a diameter larger than that of the shaft 456 and springs 457 and 458 are interposed between the flange of the member 456a and the stepped wall 454a and between the flange of the member 456b and the stepped wall 455a so as to impart the tool clamping force to the clamp arms 451 and 452.

Figure 8:
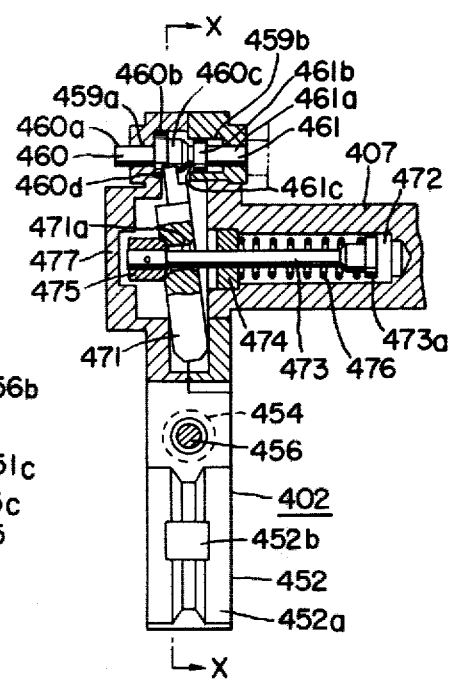
FIGS. 8 and 9 show cross sectional views taken along the line VIII—VIII shown in FIG. 7 when a tool is clamped by the tool conveying arm member.

In order to ensure that the clamp arms can firmly clamp a tool therebetween, there are provided stepped holes 459a and 459b and pins 460 and 461 inserted thereinto. The holes are coaxial with each other and in parallel with the axis of the shaft 407 at a position where a tool has been clamped. The pin 460 comprises a guide portion 460a, an intermediate portion 460b having a diameter larger than that of the guide portion 460a and a locating portion 460c provided with a notch 460d as shown in FIG. 8. The guide portion 460a is inserted into the hole 459a to be slidable in an axial direction of the pin 460 and the locating portion 460c can be slid into the hole 459b when the pin 460 is slid rightwardly as shown in FIG. 9 by the operation of a clamp key 471 in engagement with the notch 460d. The other pin 461 comprises a guide portion 461a, an intermediate portion 461b having a diameter larger than that of the guide portion 461a, and a push head 461c. The pin 461 is slidably fitted in the hole 459b.

A shaft 473 is disposed within a blind bore 472 formed within the shaft 407 and the opening of the bore 472 is closed by a nut 474 which is attached to the wall of the bore 472 and idly supports the shaft 473, which is provided at its one end with a member 473a having a diameter larger than that of the body of the shaft 473. A spring 476 is interposed between the nut 474 and the flange of the end member 473a. The clamp key 471 is provided with a through hole 471a at its central portion through which the other end of the shaft 473 idly passes and a stopping member 475 is mounted to the end of the shaft projecting through the hole 471a thereby to prevent the leftward movement of the clamp key 471 due to the urging force of the spring 476 as shown in FIG. 8.

Figure 12:
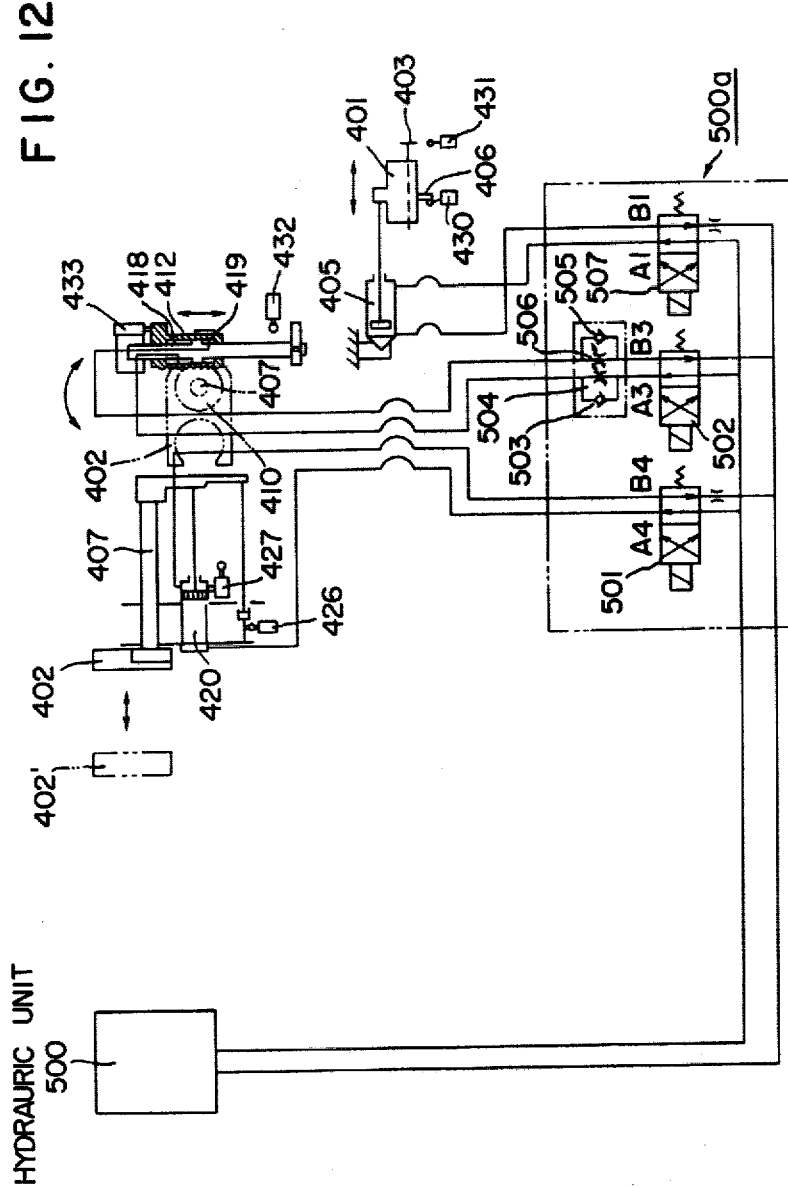
FIG. 12 shows a diagram showing a hydraulic drive system for operating the tool conveying mechanism shown in FIG. 2.

A hydraulic drive system for driving the tool conveying mechanism will be described hereunder in conjunction with FIG. 12.

A hydraulic unit 500 including hydraulic supply source supplies pressurized oil to a hydraulic operating system 500a to reciprocate and rotate the tool conveying arm member 402 and successively to reciprocate the tool carriage 401. The control of the reciprocation of the tool conveying arm member 402 is performed by a direction transfer value 501 and a hydraulic cylinder-piston assembly 420 operatively connected to the transfer valve 501.

The tool conveying arm member 402 is clockwisely rotated through the rotation shaft 407 by the pinion 410 in engagement with the rack 412 which is driven by the pressurized oil supplied into the oil chamber 418 through a direction transfer valve 502 and a check valve 503. The arm member 402 is counterclockwisely rotated by supplying the pressurized oil into the oil chamber 419 through a check valve 505 by switching the direction transfer valve 502. Variable throttle valves 504 and 506 are arranged in the hydraulic operating system 500a to vary the rotation speed of the tool conveying arm 402 by controlling the valves 504 and 506.

The control of the reciprocation of the tool carriage 401 is performed by switching a direction transfer valve 507 so as to supply pressurized oil to a hydraulic cylinder-piston assembly 403.

The tool conveying mechanism 400 operates as follows.

At first, a predetermined tool is indexed to a position shown as a tool pot 201a in FIG. 1. The hydraulic cylinder-piston assembly 405 is then operated to move the tool carriage 401 from its rightward limit position shown in FIG. 3 to a position at which the dog 406 attached to the tool carriage 401 abuts against the limit switch 430. When the dog 406 contacts with the limit switch 430, a signal is generated thereby to stop the supply of the pressurized oil from the hydraulic assembly 405 and then stop the movement of the tool carriage 401. Thus, the tool conveying arm 402 is positioned at its backward limit position, where a tool 600 (FIG. 7 or FIG. 10) can be grasped by the arcuate portions of the clamp arms 451 and 452. At this time, the righthand end of the guide portion 461a of the pin 461 abuts against a dog, not shown, of the tool carriage 401 and the pin 460 is pushed leftwardly as viewed in FIG. 8, so that the pin 460 disengages from the hole 459b and the clamp arms 460 and 452 of the tool conveying arm member 402 are opened as shown in FIG. 10.

The hydraulic cylinder-piston assembly 420 is operated in response to the signal generated at the time when the dog 406 abuts against the limit switch 430 thereby to forwardly move the tool conveying arm member 402. The arm member advances along an operating guide plate 463 (FIG. 4) as a guide member until the pin 460 has been completely fitted into the holes 459a and 459b. Thus, the clamp arms firmly hold the tool 600.

The fact that the tool conveying arm member 402 has reached its forward limit is detected by the contact of the supporting plate 421 with the limit switch 427 and at this time a signal is generated thereby to stop the operation of the hydraulic cylinder-piston assembly 420. Concurrently, the hydraulic cylinder-piston assembly 405 is operated to rightwardly move the tool carriage 401 and the fact that the tool carriage 401 has reached its rightward limit position is detected in contact of the dog 406 with the limit switch 431. At this time, a signal is generated from the limit switch 431 thereby to stop the movement of the tool carriage 401 and pressurized oil is fed into the oil chamber 418 through the direction transfer valve 502 and the check valve 503 in response to the generated signal. Therefore, the cylinder 416a, i.e. rack 412, of the hydraulic assembly 416 is lowered and the pinion 410 in engagement with the rack 412 is clockwisely rotated. The tool conveying arm member 402 is also clockwisely rotated through the rotation shaft 407 engaged with the pinion 410, and consequently, according to a series of operations described above, the rotation of the arm member 402 can be detected by the contact of the lower end of the cylinder 416a with the limit switch 432.

At the next step, the hydraulic cylinder-piston assembly 420 is again operated to bring back the tool conveying arm member 402 and the tool 600 held by the clamp arms is transferred to the intermediate tool pot 301. At this time, the end of the guide portion of the pin 461 abuts against the dog of the tool carriage 401 and the supporting plate 463 contacts with the lower surface of the clamp arm 451, thereby supporting the tool clamp arms before the tool 600 is transferred into the intermediate tool pot 301. When the operating plate 463 is disengaged from the lower surface of the arm 451, the tool carriage 401 pushes the end of the pin 461 and in turn the pin 461 pushes the pin 460 leftwardly. Thereafter, when the clamp arm 451 has been completely released from the operating plate 463 and the pin 460 is disengaged from the hole 459b, so that the tool 600 held by the arm member 402 is released. The tool conveying arm member 402 is then backwardly moved together with the bar 422 and the arm member 402 is stopped at its backward limit position when the dog 423 is disengaged from the limit switch 426 having a normally closed contact.

The tool carriage 401 is moved to its leftward limit position by the operation of the hydraulic cylinder-piston assembly 405 and stopped there when the dog 406 abuts against the limit switch 430.

Next, the swingable arm 302 is rotated by the operation of the hydraulic cylinder-piston assembly 303 to a position where the axis of the spindle 101 is in parallel with the axis of the intermediate tool pot 301. The tools received in the intermediate tool pot 301 and the spindle 101 are simultaneously exchanged and the swingable arm is then rotated to the original position. The tool carriage 401 is again rightwardly moved and the arcuate portions 451a and 452a of the clamp arms are positioned to positions suitable for holding the grip portion of the tool received in the intermediate tool pot 301.

The tool conveying arm member 402 is forwardly moved by the operation reverse to that described hereinbefore and the tool received in the intermediate tool pot 301 is transferred therefrom. The arm member 402 is then counterclockwisely rotated by 180°. The tool carriage 401 is then shifted to the leftward limit position, so that the tool conveying arm member 402 is backwardly moved and the tool held by the clamp arms is returned in a tool pot of the tool storage magazine 200. Thereafter, the tool carriage 410 is shifted to the rightward limit position and settled there. In this manner, one tool exchanging cycle has completely ceased and a tool in the tool storage magazine selected for the next working operation will be successively exchanged with a used tool in the spindle by repeating the tool exchanging cycle described hereinabove.

We claim:

1. In an automatic tool exchanging apparatus of a machine tool of the type comprising a machine body, a magazine for storing a number of tools located on the side of said machine body, a spindle of the machine tool, a tool exchanging mechanism and a tool conveying mechanism which are located between said spindle and said tool storage magazine, and means for driving said tool exchanging and conveying mechanisms, said tool exchanging mechanism being provided with an intermediate tool pot and constructed to be swingable for exchanging a tool fitted in said spindle with a tool received in said intermediate tool pot, and said tool conveying mechanism being adapted to transfer a tool between a predetermined tool pot of said tool storage magazine and said intemediate tool pot, the improvement in which said tool conveying mechanism comprises a guide bar horizontally arranged between a predetermined position of said magazine and said intermediate tool pot, a tool carriage supported movably by said guide bar, means for reciprocating said tool carriage, a tool conveying arm member supported rotatably by said tool carriage and adapted to clamp a tool, means for rotating said tool conveying arm member mounted to said tool carriage, and means for linearly reciprocating said tool conveying arm member, said means for rotating said tool conveying arm member comprising a hydraulic cylinder-piston assembly, a cylinder of said assembly being movable, a rack member formed on one outer side surface of said cylinder, a pinion in engagement with said rack member, and a rotation shaft rotatable together with said pinion, one end of said rotation shaft being operatively connected to said tool conveying arm member.

2. The automatic tool exchanging apparatus according to claim 7 wherein said tool carriage reciprocating means comprises a hydraulic cylinder-piston assembly located in parallel with the axis of said guide bar, a piston rod of said hydraulic cylinder piston assembly being connected to said tool carriage through a bearing attached to said piston rod.

3. The automatic tool exchanging apparatus according to claim 1 wherein said tool conveying arm member is operatively connected to said rotation shaft and comprises a pair of clamp arms having arcuate portions and being rotatable in opposite directions about a common axis, means for rotating said clamp arms, and means for imparting tool clamping force to a tool held between said arcuate portions.

4. The automatic tool exchanging apparatus according to claim 3 wherein said means for rotating said clamp arms is disposed within said clamp arms and comprises a pair of pins engaged with each other and loosely inserted into a pair of aligned through holes provided respectively for said clamp arms, a clamp key having one end engaged with one of said pins and being provided with a through hole at its central portion, a shaft extending within said clamp arms and a bore formed in the interior of said rotation shaft, said shaft being provided with a flanged member at its one end, a nut closing said bore and provided with a central through hole, a spring interposed between said nut and said flanged member, said shaft loosely passing through said holes of said nut and said clamp key, and a stopping member mounted on the other end of said shaft, said pins being slid when the other one of said pins is engaged with said tool carriage to rotate said clamp arms in opposite directions.

5. The automatic tool exchanging apparatus according to claim 3 wherein said means for imparting the tool clamp force comprises a shaft disposed within a pair of aligned through holes formed through said clamp arms, said through holes being provided with stepped walls at their one ends, said shaft having flanged members at its both ends, and springs each interposed between said stepped wall and said flanged member of said shaft to normally urge said clamp arms so as to clamp a tool between said arcuate portions of said clamp arms.

6. A tool conveying arm member for transferring a tool from one member to the other member in an automatic tool exchanging apparatus of a machine tool comprising a pair of clamp arm having arcuate portions and being rotatable in opposite directions about a common axis, means for rotating said clamp arms, and means for imparting tool clamping force to a tool held between said arcuate portions, said means for rotating said clamp arms being disposed within said clamp arms and comprising a pair of pins engaged with each other and loosely inserted into a pair of aligned through holes provided respectively for said clamp arms, a clamp key having one end engaged with one of said pins and being provided with a through hole at its central portion, a shaft extending within said clamp arms and a bore formed in the interior of a rotation shaft operatively connected to said tool conveying arm member, said shaft being provided with a flanged member at its one end, a nut closing said bore and provided with a central through hole, a spring interposed between said nut and said flanged member, said shaft loosely passing through said holes of said nut and said clamp key, and a stopping member mounted on the other end of said shaft, said pins being slid when the other end of said pins is engaged with said tool carriage to rotate said clamp arms in opposite direction, said means for imparting the tool clamp force comprising a shaft disposed within a pair of aligned through holes formed through said clamp arms and having flanges at its both ends, said last mentioned through holes being provided with stepped walls at their one ends, and springs each interposed between said stepped wall and said flanges to normally urge said clamp arms so as to clamp a tool between said arcuate portions of said clamp arms.

* * * * *